Sept. 22, 1925.

G. R. WATSON

SHAPER FOR DRILL BITS

Filed Sept. 5, 1924

1,554,247

Inventor,
G. R. Watson, by
G. C. Kennedy.
Attorney.

Patented Sept. 22, 1925.

1,554,247

UNITED STATES PATENT OFFICE.

GEORGE R. WATSON, OF WATERLOO, IOWA, ASSIGNOR TO ARMSTRONG MANUFACTURING COMPANY, OF WATERLOO, IOWA.

SHAPER FOR DRILL BITS.

Application filed September 5, 1924. Serial No. 736,164.

*To all whom it may concern:*

Be it known that I, GEORGE R. WATSON, a citizen of the United States, residing at Waterloo, in the county of Blackhawk and State of Iowa, have invented certain new and useful Improvements in Shapers for Drill Bits, of which the following is a specification.

My invention pertains to shapers or dies for forming by percussion the cutting ends of drill-bits, and the object of my improvement is to supply a device which may usefully perform that purpose in the most efficient way to provide exact cutting edges and at the same time properly shape the reaming cutters and the crushing end face of the bit.

Figure 4:
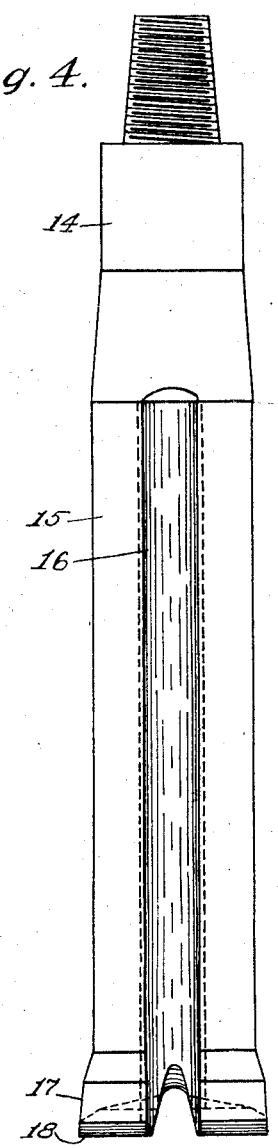
Figure 2:
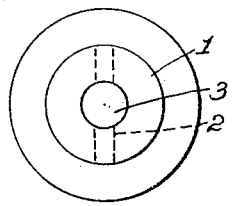
Figure 1:
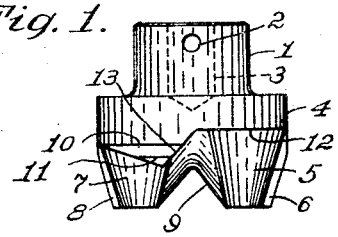
Figure 3:
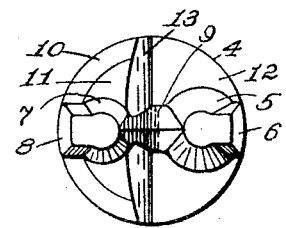
Figure 5:
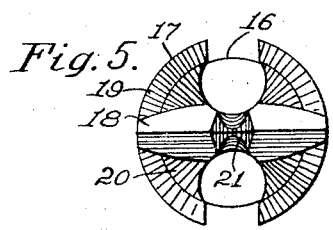

This object I have accomplished by the means which are hereinafter described and claimed and illustrated in the accompanying drawings, in which Fig. 1 is a side elevation of my improved shaper or die for forming a drill-bit working terminal, Fig. 2 is a top plan thereof, and Fig. 3 a bottom plan thereof; and Figs. 4 and 5 are respectively a side elevation and a plan of the cutting end face of a drill-bit such as is shaped in its end face parts by my said shaper.

The drill-bit referred to has the usual shank 14, elongated body 15 and opposite side longitudinal grooves 16, the grooves being shaped with their inner parts of circular cross section with the side openings of less width than the diameter of the inner parts. The drill-head 17 is widened to excavate the drill-hole in rock strata as for wells, and has on its end face a diametrical depending cutter 18, anticlinal and having a medial notch 21 with whose opposite sides the open lower ends of the grooves 16 communicate. The crushing end face of the bit is hollowed upwardly, preferably with two concentric annular planes or zones, each flat, but the outer zone 19 inclined more steeply toward the arcuate reaming edges of the tool than the inner zone 20, the latter thus supporting the reamers, while the acuteness of the latter add efficiency in use and permit sharpening with a minimum removal of material.

The shaping die for the end face and cutters of this bit has a short shank 1 with axial socket 3 to receive a stem or hammer part of an oscillating hammer of any desired type. The shank has a transverse threaded hole at 2 to receive a pin.

The die has a widened body 4, relatively short.

The working end face of said shaping die has a flat face 12 at one side of a diameter thereof, and bounded by said diameter a flat inclined part or shoulder 13, relatively narrow. This is best shown in plan in Fig. 3, and the end face at the opposite side of this shoulder is shaped with concentric zones 10 and 11, the zones both inclined relative to the axis of the die, the outer zone 10 having the least inclination.

Similar conical frustums 5 and 7 project from the flat end face 12 and from the two zone face parts 10, 11 respectively, opposite each other, and each frustum has on its outer side a projection as at 6 and 8 of trapezoidal shape whose function will be described.

Connecting the frustums 5 and 7 in alinement is a part 9 which, as shown in Fig. 1, is notched in a V-shape and has anticlinal side faces extending at one side of the die to the sloping shoulder 13.

In using the die 4 to shape the cutting terminal of the bit 15, the bit is supported throughout its length on any suitable base or device to permit it to be steadily rocked to and fro manually on its longitudinal axis while being prevented from shifting longitudinally under percussion.

The die is attached to some apparatus which may place it in rapid reciprocation longitudinally in line with the bit 15 longitudinally and axially so that a rapid percussion takes place against the bit end face. The frustums 5 and 7 together with their trapezoidal projections enter the ends of the grooves 16 which have theretofore been made in the bit body, and thus guide the bit in its operation upon said end face.

It will be understood that the percussion of the die upon the end face of the bit rapidly shapes the latter into the form shown in the bit illustrated in Figs. 4 and 5.

When the die has been used for a time, the sloping shoulder acts in forming one anticlinal slope of the bit cutter 18. The bit is then manually rocked one-half way around, so that the die may act to shape the other anticlinal face of said cutter. The reversing of the bit during this operation upon it, whereby the shoulder 13 of the die works alternately to shape the slopes of the cutter 18, results in a drawing out of the cutter part gradually by impacts upon opposite faces which drawing out is in line with the fibers of the metal and shapes the cutter with an exact cutting angle, not possible when the metal of the cutter has to be forced into a notch, as the latter operation allows the metal to become misshapen and rounded where it should be edged.

Having described my invention, what I claim as new, and desire to secure by Letters Patent, is:

1. A shaping die for a drill-bit, having a sloping shoulder bounded by a diameter of its end face, and frustal guide projections upon said end face at opposite sides of said shoulder and connected by a ridge part.

2. A shaping die for a drill-bit, having a sloping shoulder bounded by a diameter of its end face along one side, the end face at the opposite side being shaped with concentric differently inclined zones.

3. A shaping die for a drill-bit, having a sloping shoulder bounded along one side by a diameter of its end face, the end face at the opposite side of the shoulder being shaped with concentric differently inclined zones, and guide projections on opposite parts of said end face.

4. A shaping die for a drill-bit, having a sloping shoulder across its end face, the end face at one side of said shoulder being shaped with concentric differently inclined zones, and frustal guide projections on said end face at opposite sides of said shoulder and having on their outer sides trapezoidal guide projections.

In testimony whereof I affix my signature.

Waterloo, Iowa, Aug. 5, 1924.

GEORGE R. WATSON.